United States Patent [19]

DuPlanti

[11] Patent Number: 4,790,073
[45] Date of Patent: Dec. 13, 1988

[54] GAUGE PIN HOLDER

[76] Inventor: Robert L. DuPlanti, 627 N. Citrus Ave., Vista, Calif. 92084

[21] Appl. No.: 130,164

[22] Filed: Dec. 8, 1987

[51] Int. Cl.⁴ ............................................. G01B 3/46
[52] U.S. Cl. ................................ 33/178 B; 33/501; 279/96
[58] Field of Search ................. 33/178 B, 178 R, 1 R, 33/501; 279/96, 102; 403/19, 314

[56] References Cited

U.S. PATENT DOCUMENTS

| | | | |
|---|---|---|---|
| 1,626,176 | 4/1927 | Atwood | 33/178 B |
| 2,337,461 | 12/1943 | Fuhr | 33/178 B |
| 2,582,679 | 1/1952 | Carroll | 33/178 B |
| 2,861,347 | 11/1958 | Von Tarnik | 33/178 B |
| 2,903,797 | 9/1959 | Porter | 33/178 B |
| 3,497,250 | 2/1970 | Sommer | 33/178 BX |
| 3,785,059 | 1/1974 | Breau | 33/178 B |
| 4,107,850 | 8/1978 | Adler | 33/178 B |

Primary Examiner—William D. Martin, Jr.
Attorney, Agent, or Firm—John J. Murphey

[57] ABSTRACT

A gauge pin holder including a straight handle with thickened end portions, each end portion having a transverse end slot, a pair of boots adapted to fit in the slots with sideways-directed wings, a passageway in each boot aligned with a pair of bores through each wall forming the slot, and a sleeve in each passageway for receipt of a gauge pin therein, wherein a threaded shaft containing a knurled end knob is threaded through aligned apertures in the handle and boot to force the sleeve and pin down in the passageway and the pin against the wings to hold the pin tightly therein.

20 Claims, 2 Drawing Sheets

GAUGE PIN HOLDER

BACKGROUND OF THE INVENTION

1. Field of the Invention

This invention relates to the field of hand tools for the machinist industry. More particularly, this invention concerns a gripping device for holding gauge pins for use in determining when desired hole size has been achieved.

2. Description of the Prior Art

In drilling holes in metals and ceramics, high tolerances for exactness of hole size is critical. Short tubular pins called "gauge pins", machined to exact diameters, are sold to machinists and widely used throughout the industry for insertion into freshly drilled holes for determination as to whether the proper diameter has been achieved. The words "GO" and "NO GO" are industry nomenclature representing successful achievement of proper hole size and less than successful achievement respectively. Prior to achieving the proper sized hole, the maximum and minimum sized pins, corresponding to the maximum and minimum diameter or "call-out" in the blue prints, will not fit or "NO GO" in the hole. When the proper hole size has been achieved, the minimum size pin fits tightly or "GOES" in the hole.

Because of the tight fit between the gauge pin and the hole into which it is inserted, the pins cannot be inserted and withdrawn by hand. The pin is too smooth and is hard to hold; the fit develops substantial friction between the pin and the hole, too much for hand-holding of the pin. Furthermore, body oils and perspiration transferred from the machinist's hand to the pin alters the dimensional tolerance of the pin and is a source of potential corrosion of the metal making up the pin. For these reasons, gauge pins have traditionally been mounted in holders and the holders gripped with the hand for use.

Gauge pin holders are many and varied. They abound in all machine shops. They possess numerous disadvantages, however, that have marked them as a constant source of irritation to machinists. For instance, the most popular gauge pin holders comprise a two-halved, elongated handle with axial grooves set adjacent the ends for receipt of the gauge pins. The handles are joined by a threaded cross-bolt midway between the two ends, see U.S. Pat. No. 3,515,398. This holder suffers from a serious problem in that as the cross-bolt is tightened, the gauge pins at the ends generate torque about the cross-bolt that results in fractures in the handle.

Other problems are that the present gauge pin holders have to be hand-made and are rather expensive - see U.S. Pat. Nos. 1,980,087; 2,392,317; 2,582,679; 2,861,347; 3,023,015; 3,515,398; 3,754,767; 4,143,446 and French Pat. No. 80247. Many of them have center-mounted clasping features that bend and fracture when tightened, see U.S. Pat. Nos. 560,821; 2,345,750; 2,582,679; 2,861,347 and 3,515,398. Many of them do not have full-width clamping thereby posing damage to the gauge pin from over-clamping in one particular spot, see U.S. Pat. Nos. 2,065,472; 2,392,317; 2,582,679; 2,861,347; 3,023,015 and 3,515,398. Other holders do not have a long enough handle to be easily usable, see U.S. Pat. Nos. 2,044,679 and 3,023,015. Some do not have separate adjustments for each pin to be held therein, see U.S. Pat. Nos. 560,821; 2,044,679; 2,582,679 and 4,343,446. Many holders have no ability to hold a variety of sizes or hold them all in one direction, see U.S. Pat. Nos. 1,980,087; 2,392,317; 4,143,446 and French Pat. No. 80247. Some holders do not mount the pins axial to the handle, see U.S. Pat. Nos. 1,980,087 and 2,903,797. Others cannot hold two distinct sizes of gauge pins without difficulty, see U.S. Pat. Nos. 560,821; 1,980,087; 2,044,679; 2,065,472; 2,582,679; 3,515,398; 4,143,446 and French 80247. Finally, many holders are not amenable to easy gauge pin changing, see U.S. Pat. Nos. 2,345,749; 2,345,750; 2,392,317; 2,861,347 and 4,143,446.

SUMMARY OF THE INVENTION

This invention is a gauge pin holder that overcomes all of the aforedescribed problems in the prior art. In the first place, it holds two pins axially at the spaced-apart ends of the handle, however, each end has its own independent adjustment thus eliminating the torque and fracture problems. It presents full-width clamping to the pins thus removing problems associated with spot clamping. It has a long handle for easy use. It is capable of holding a wide variety of pin sizes and interchangeability is accomplished with a mere twist of a knob. Finally, and most importantly, this novel gauge pin holder is capable of very low-cost manufacturing techniques as many of the pieces may be extruded and then cut to size.

Accordingly, the main object of this invention is a low-cost gauge pin holder that can hold a wide variety of sizes of pins in axial position, that has independent pin clamping means and that is void of the couple-generating problems of the prior art. Other objects include a pin holder for holding various sizes of pins in a single pin-holding clamp and holding them under conditions where no spot forces will build up to deform the pins. These and other objects of the invention will become more apparent upon reading the following description of the preferred embodiments taken together with the drawings that are appended hereto. The scope of protection sought by the inventor may be obtained by a fair reading of the claims that conclude this specification.

DESCRIPTION OF THE PREFERRED EMBODIMENT

Figure 1:
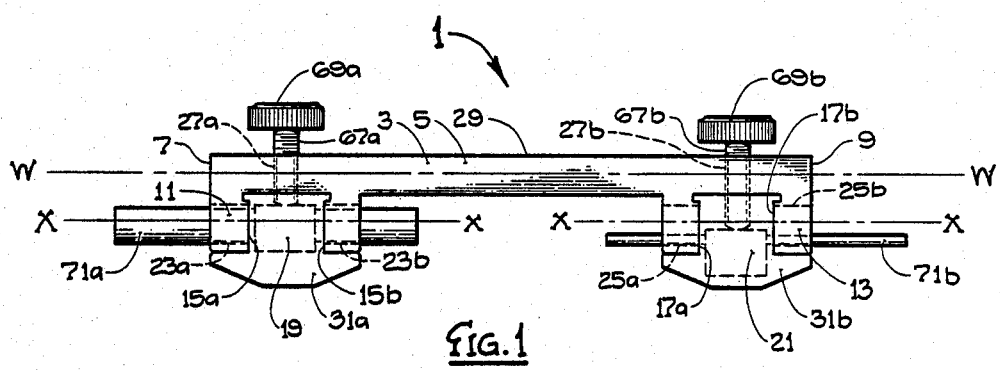
FIG. 1 is a side elevational view of a fully assembled embodiment of the gauge pin holder of this invention showing two gauge pins of different size positioned and clamped therein ready for use.
Figure 2:
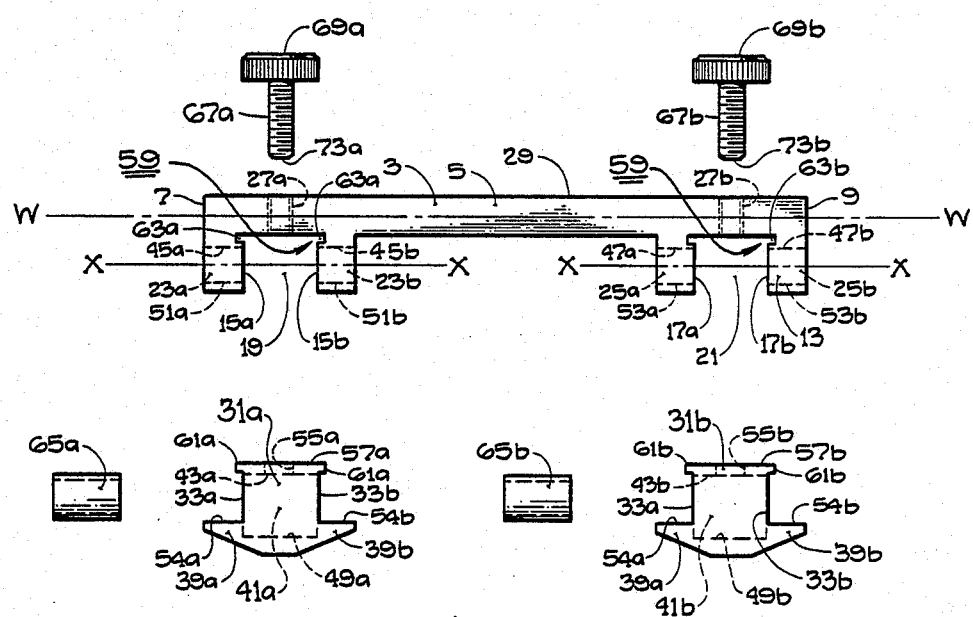
FIG. 2 is the same view as in FIG. 1 except that the parts are disassembled for ease of viewing and the pins are removed.

As depicted in FIG. 1, the preferred embodiment of the gauge pin holder of this invention is shown generally at 1 and is shown to comprise a straight, elongated handle 3, having a central grasping portion 5 located about central axis w—w and is of terminal length, terminating at spaced-apart ends 7 and 9. Near ends 7 and 9, handle 3 has thickened portions 11 and 13. Handle 3 is preferably of a rectangular cross-section (see FIGS. 6 and 7) and fabricated of an easily extrudable metal such as aluminum and other well-known compositions, including plastic.

Two pairs of opposed, spaced-apart walls 15a–15b and 17a–17b define a pair of spaced-apart slots 19 and 21 transversely through each thickened end portion 11 and 13 respectively. Slots 19 and 21 are preferably of equal width, however, as will be seen in the following description, slots of unequal width may be utilized in this invention and are fully contemplated herein. First and second pairs of opposed bores 23a–23b and 25a–25b, preferably of circular cross-section and equal diameter, are formed in thickened handle end portions 11 and 13 respectively, in mutual alignment along an axis x—x and substantially parallel to handle 3. First opposed bores 23a and 23b open through spaced-apart walls 15a–15b into slot 19 and opposed bores 25a and 25b open through walls 17a–17b into slot 21.

A pair of threaded apertures or holes 27a and 27b are formed through the top surface 29 over respective slots 19 and 21 so as to intercept said slots preferably centrally therein.

A pair of boots 31a–31b are provided, generally defined by pairs of intersecting, spaced-apart parallel walls 33a–33b and 35a–35b, and preferably are of a size to fit into slots 19 and 21 respectively and flush with the sides 37a and 37b of handle 3. Preferably, boots 31a and 31b are of rectangular cross-section and fabricated from an easily extrudable metal or plastic similar in characteristics to the material from which handle 3 is fabricated. A pair of wings 39a–39b extend outward from the lower portion of boots 31a and 31b, generally in a direction parallel to handle axis w-w, to provide for a finished undersurface for gauge pin holder 1 when boots 31a and 31b are inserted in respective slots 19 and 21.

A passageway 41a and 41b is formed through each boot 31a and 31b having a greater dimension along axis $Y_1$—$Y_1$ in one direction and a lesser dimension along axis $Y_2$—$Y_2$ in a direction perpendicular or normal thereto. While passageways 41a and 41b may take numerous forms including a rectangle, it is preferred that they take the form of an elliptical bore having a major elliptical diameter centered in boot 31a and 31b and falling on axis $Y_1$—$Y_1$, with a minor elliptical diameter normal to the major elliptical diameter, centered in boot 31a and 31b and falling on axis $Y_2$-$Y_2$. Even more preferred is where passageways 41a and 41b have a lesser dimension or minor elliptical diameter· slightly greater than the diameter of bores 23a–23b and 25a–25b and the major diameter falls on axis $Y_1$—$Y_1$, that in turn lies in a plane, z—z, that is common to handle axis w—w and the axis x—x of said first pair and second pair of bores 23a–23b and 25a–25b. The term "slightly greater than" refers to the dimension that compensates for the wall thickness of sleeves employed therein as will be hereinafter more fully described.

Figure 3:
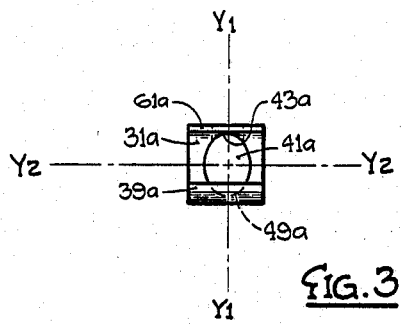
FIG. 3 is an end elevational view of one of the boots shown in FIG. 2.
Figure 4:
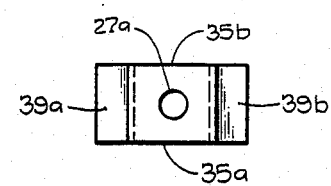
FIG. 4 is a top plan view of the boot shown in FIG. 3.

Passageways 41a and 41b are preferably arranged so that the upper walls thereof, 43a–43b, are coincident with the upper bore walls 45a–45b and 47a–47b of first pair of bores 23a–23b and second pair of bores 25a–25b respectively. As the major dimension or major elliptical diameter $Y_1$-$Y_1$ of passageways 41a and 41b are greater than the diameter of bores 23a–23b and 25a–25b, the lower passageway walls 49a–49b lie below lower walls 51a–51b of first pair of bores 23a–23b, below lower walls 53a–53b of bores 25a–25b respectively as well as below flat surfaces 54a and 54b formed on wings 39a and 39b. This feature is further shown in FIG. 3 and its use will be hereinafter more fully explained.

A pair of non-threaded apertures 55a and 55b are formed through the top surfaces 57a and 57b of boots 31a and 31b and are of a size no smaller than threaded apertures 27a and 27b and are positioned to align with threaded apertures 27a and 27b when boots 31a and 31b are placed in operative position in their respective slots 19 and 21. It is preferred that threaded apertures 27a–27b and non-threaded apertures 55a–55b are circular holes.

A means 59 is provided for retaining boots 31a and 31b in their respective slots 19 and 21 and is shown to comprise a pair of opposed ridges 61a and 61b that extend outwardly from opposite sides of boots 31a and 31b adjacent their contact with slot walls 15a–15b and 17a–17b respectively and a pair of complementary, inwardly directed grooves 63a–63b, of similar depth and width as ridges 61a and 61b, formed in respective walls 15a–15b and 17a–17b for receipt therein of ridges 61a and 61b. Boots 31a and 31b are inserted in slots 19 and 21 from the sides of handle 3 by sliding ridges 61a and 61b into complementary grooves 63a and 63b. Other means are usable herein such as a wrap-around cuff surrounding the boots and handle; a spring clip holding the boots in the slots and a spring-ball-detent arrangement. All of these are fully contemplated in this invention.

A pair of sleeves 65a and 65b, preferably short lengths cut from rigid tubing, are provided for insertion in passageways 41a and 41b in boots 31a and 31b for free movement therein toward and away from handle axis w—w. Sleeve 65a and 65b are of a length no greater than the width of respective slots 19 and 21 and are of an outside diameter at least equal to and preferably greater than the diameter of respective first and second pairs of bores 23a–23b and 25a–25b. The preferred larger diameter insures total capture of said sleeves within the assembled boots and prevents accidental escape and loss. The minor diameter of passageways 41a and 41b are slightly larger than the diameter of respective first and second pairs of bores 23a–23b and 25a–25b to allow for the wall thickness of sleeves 65a and 65b and to allow them to move freely up and down in passageways 41a and 41b.

A pair of threaded shafts 67a and 67b, preferably capped with knobs 69a and 69b for aid in turning them, are provided and are sized for threaded receipt in threaded apertures 27a and 27b. When boots 31a and 31b are inserted in respective slots 19 and·21, shafts 67a and 67b will, after passing through threaded apertures 27a and 27b, also pass through adjacent aligned non-threaded apertures 59a and 59b to enter into passageways 41a and 41b respectively.

Figure 6:
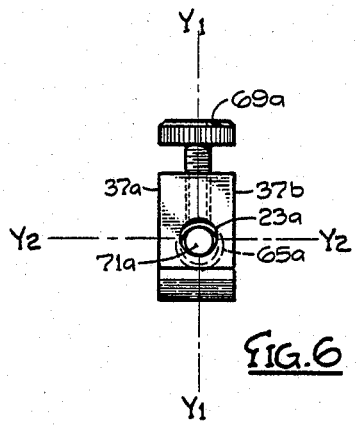
FIG. 6 is one end elevational view of the embodiment shown in FIG. 1 showing the larger gauge pin being held therein; and, FIG. 7 is the other end elevational view of the embodiment shown in FIG. 1 showing the smaller gauge pin being held therein.
Figure 7:
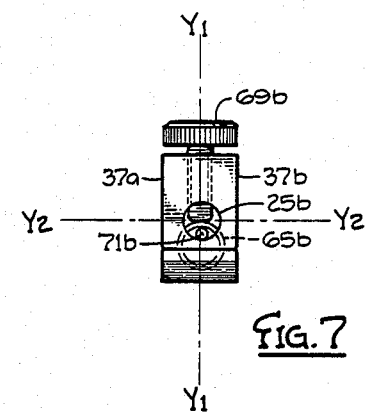

As shown in FIG. 1 and more clearly in FIGS. 6 and 7, sleeves 65a and 65b are inserted into passageways 41a and 41b in boots 31a and 31b and the boots inserted into their respective slots 19 and 21. Gauge pins 71a and 71b are then inserted in through handle ends 7 and 9 and into their respective sleeves 65a and 65b, in bores 23a–23b and 25a–25b. Gauge pins 71a and 71b are therefore housed within passageways 41a and 41b and their respective adjacent pairs of bores 23a–23b and 25a–25b and they stick out from handle ends 7 and 9 for use in inserting into a drilled hole for testing the width thereof.

When knobs 69a and 69b are twisted to drive threaded shaft 67a and 67b down through threaded apertures 27a and 27b and non threaded aligned apertures 55a and 55b, the lower ends 73a and 73b of shafts 67a and 67b contact sleeves 65a and 65b, carrying gauge pins 71a and 71b, and push sleeves 65a and 65b and the gauge pins downward in boots 31a and 31b toward wing surfaces 54a and 54b. Gauge pins 71a and 71b then engage lower bore walls 51a-51b and 53a-53b so that further tightening of shafts 67a and 67b clamp gauge pin 71a and 71b between sleeves 65a-65b and walls 51a-51b and 53a-53b to hold them tightly therein. This broad pressure, exerted along the length of sleeves 65a and 65b, against gauge pins 71a and 71b, relieves the spot clamping problems of the prior art.

As shown in FIG. 6, shaft 67a is not threaded too far into passageway 41a when the gauge pin is a large diameter one, generally of the size of the interior diameter of the sleeve 65. However, smaller diameter gauge pin 71b, shown in FIG. 7, is fully clampable in this novel gauge pin holder. Sleeve 65b, being larger in diameter than its respective gauge pin, is forced by threaded shaft 67b down into the lower part of passageway 41b and below the aligned lower walls 53a and 53b of second pair of bores 25a and 25b. By this means, gauge pins of various diameters may be operatively retained in novel gauge pin holder 1 without changing any of the subcomponents thereof. Changing gauge pins merely requires a twist of threaded shaft 67a or 67b to relieve the pressure on its respective sleeve, the gauge pin withdrawn from the end of handle 3; a new gauge pin inserted in through the bore and into the sleeve; and the threaded shaft turned down against the sleeve.

Figure 5:
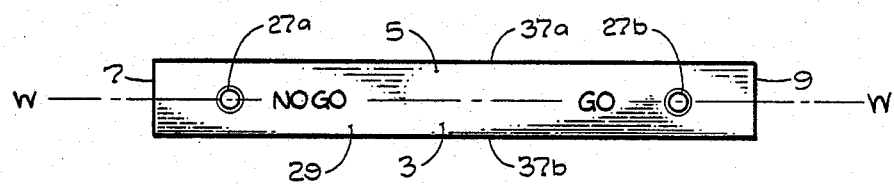
FIG. 5 is a top plan view of the handle shown in FIG. 2.

As shown in FIG. 5, directive indicia, such as "GO" and "NO GO" may be printed on handle 3, such as on handle top 29, to aid the user in remembering which gauge pin is the proper one to use.

What is claimed is:

1. A gauge pin holder, comprising:
   (a) an elongated handle of terminal length having thickened end portions;
      (1) walls defining a pair of slots, one slot formed transversely through each said thickened end portion of said handle;
      (2) first and second pairs of bores, one pair formed in through each of said handle ends and thickened end portions, said bores in each pair being mutually aligned substantially parallel to said handle and opening through opposing walls into said slot; and,
      (3) a pair of threaded apertures, one formed through each said thickened handle end portion intercepting a respective slot therein;
   (b) a pair of boots sized to fit into said slots;
      (1) a passageway through each said boot for general alignment with one of said pairs of bores in said thickened handle end portions, said passageways having a greater dimension in one direction and a lesser dimension in a direction normal thereto;
      (2) a non-threaded aperture formed in each boot for alignment with said threaded aperture, in said thickened handle end portion, when said boot is positioned in said slot; and,
      (3) means for retaining said boots in said slots;
   (c) a pair of sleeves, for receipt in said passageways in said boots, each having a diameter at least as great as said lesser dimension, for free movement in said boot, toward and away from said handle; and,
   (d) a pair of shafts, adapted for threaded receipt in said threaded apertures and passage through said adjacent aligned non-threaded aperatures, each for bearing against a respective sleeve, centrally holding a gauge pin therein that extends across said slot, into said adjacent passageways and out through said handle end, to clamp the gauge pin between said sleeve and the walls of said pair of said adjacent bores.

2. The gauge pin holder of claim 1 wherein said handle is straight.

3. The gauge pin holder of claim 1 wherein said handle is of a rectangular cross-section.

4. The gauge pin holder of claim 1 wherein said first and second pairs of bores are of circular cross-section and of equal diameter.

5. The gauge pin holder of claim 1 wherein said passageways comprise elliptical bores through said boots having equal major diameters that are mutually aligned.

6. The gauge pin holder of claim 5 wherein said handle is straight and the major elliptical diameters of said elliptical bores and the axis of said handle lie in a common plane.

7. The gauge pin holder of claim 1 wherein said passageways through said boots have equal lesser dimensions that are equal to the diameters of said first and second pairs of bores.

8. The gauge pin holder of claim 1 wherein said means for retaining said boots in said slots comprises a pair of opposed ridges extending outwardly from each said boot adjacent its contact with the walls of said slot and a pair of complementary, inwardly directed grooves formed in said walls defining said slot for receipt therein of said ridges.

9. The gauge pin holder of claim 1 wherein said boots have a rectangular cross-section.

10. The gauge pin holder of claim 1 wherein said sleeves are of equal diameter.

11. The gauge pin holder of claim 1 wherein said shafts include end-knobs for turning said shafts in said threaded apertures.

12. The gauge pin holder of claim 1 wherein said sleeves are short pieces of tubing and have an outside diameter greater than the diameters of said first and second pairs of bores.

13. A gauge pin holder, comprising:
   (a) a straight, elongated handle of rectangular cross-section and of terminal length having thickened end portions;
      (1) walls defining a pair of slots of equal width, one slot formed transversely through each said thickened end portion of said handle;
      (2) first and second pairs of bores of circular cross-section and equal diameter, one pair formed in through each of said handle ends and thickened end portions, said bores in each pair being mutually aligned, substantially parallel to said handle and opening through opposing walls into said respective slot; and,
      (3) a pair of threaded apertures, one formed through each said thickened handle portion, intercepting said respective slot therein;
   (b) a pair of boots sized to fit into said slots;

(1) a passageway through each said boot for alignment with one of said pairs of bores in said thickened handle end portions, said passageways having a greater dimension in one direction and a lesser dimension in a direction normal thereto wherein said central portion of said greater dimension and the axis of said handle lie in a common plane;

(2) a non-threaded aperture formed in each boot for alignment with said threaded aperture, in said thickened handle end portion, when said boot is positioned in said slot; and, (3) means for retaining said boots in said slots;

(c) a pair of sleeves, for receipt in said passageways through said boots, each having a diameter no greater than the diameter of said bores adjacent said slot in which said boot is received, for free movement in said boot, toward and away from said handle; and, (d) a pair of shafts, adapted for threaded receipt in said threaded apertures and passage through said adjacent aligned non-threaded apertures, each for bearing against a respective sleeve, centrally holding a gauge pin therein that extends across said slot, into said adjacent bores and out through said handle end, to clamp the gauge pin between said sleeve and the walls of said pair of said adjacent bores.

14. The gauge pin holder of claim 13 wherein said passageways comprise elliptical bores through said boots having equal major elliptical diameters and said diameters that are mutually aligned.

15. The gauge pin holder of claim 13 wherein said means for retaining said boots in said slots comprises a pair of opposed ridges extending outwardly from each said boot adjacent its contact with said walls defining said slot and a pair of complementary, inwardly directed grooves formed in said walls for receipt therein of said ridges.

16. The gauge pin holder of claim 13 wherein said boots have a rectangular cross-section.

17. The gauge pin holder of claim 13 wherein said sleeves are of equal diameter.

18. The gauge pin holder of claim 13 wherein said shafts include end-knobs for turning said shafts in said threaded apertures.

19. The gauge pin holder of claim 13 wherein said sleeves are short pieces of tubing.

20. A gauge pin holder, comprising:

(a) a straight, elongated handle of rectangular cross-section and of terminal length having thickened end portions;

(1) spaced-apart walls defining a pair of slots of equal width, one slot formed transversely through each said thickened end portion of said handle;

(2) first and second pairs of bores of circular cross-section and equal diameter, one pair formed in through each of said handle ends and thickened end portions, said bores in each pair being mutually aligned, substantially parallel to said handle and opening through said opposing, spaced-apart walls into said respective slot; and, (3) a pair of threaded apertures, one formed through each said thickened handle portion, intercepting said respective slot therein;

(b) a pair of boots having a rectangular cross-section sized to fit into said slots;

(1) an elliptical passageway through each said boot for alignment with one of said pairs of circular bores in said thickened handle end portion, said elliptical passageway having a major elliptical diameter greater than the diameter of said adjacent bores, the major elliptical diameters of said passageways and the axis of said handle lying in a common plane and wherein said elliptical passageways further have equal minor elliptical diameters slightly greater than the diameters of said first and second pairs of bores;

(2) a non-threaded aperture formed in each boot for alignment with said threaded aperture, in said thickened handle end portion, when said boot is positioned in said slot; and, (3) means for retaining said boots in said slots including a pair of opposed ridges extending outwardly from each said boot adjacent its contact with said walls defining said slot and a pair of complementary, inwardly directed grooves formed in said walls for receipt therein of said ridges.

(c) a pair of sleeves of equal diameter, comprising short pieces of tubing, for receipt in said elliptical passageways in said boots, each having a diameter no greater than the diameter of said bores adjacent said slot in which said boot is received, for free movement in said boot, toward and away from said handle; and, (d) a pair of shafts, including end-knobs for turning said shafts, adapted for threaded receipt in said threaded apertures and passage through said adjacent aligned non-threaded apertures, each for bearing against a respective sleeve, centrally holding a gauge pin therein that extends across said slot, into said adjacent bores and out through said handle end, to clamp the gauge pin between said sleeve and the walls of said pair of said adjacent bores.

* * * * *